(12) United States Patent
Sasakawa et al.

(10) Patent No.: US 11,350,630 B2
(45) Date of Patent: Jun. 7, 2022

(54) 1-AMINO-1-CYCLOPROPANECARBOXYLIC ACID HYDROCHLORIDE FORMULATIONS

(71) Applicant: Valent BioSciences LLC, Libertyville, IL (US)

(72) Inventors: Mitsuhiro Sasakawa, Tokyo (JP); Parvesh Sharma, Buffalo Grove, IL (US); Bala N. Devisetty, Buffalo Grove, IL (US); Yueqian Zhen, Gurnee, IL (US)

(73) Assignee: VALENT BIOSCIENCES LLC, Libertyville, IL (US)

( * ) Notice: Subject to any disclaimer, the term of this patent is extended or adjusted under 35 U.S.C. 154(b) by 0 days.

(21) Appl. No.: 16/914,585

(22) Filed: Jun. 29, 2020

(65) Prior Publication Data

US 2020/0323214 A1 Oct. 15, 2020

Related U.S. Application Data

(63) Continuation-in-part of application No. 15/940,324, filed on Mar. 29, 2018, now Pat. No. 10,694,748.

(60) Provisional application No. 62/479,524, filed on Mar. 31, 2017.

(51) Int. Cl.
| | |
|---|---|
| *A01N 53/00* | (2006.01) |
| *A01N 25/02* | (2006.01) |
| *A01N 37/42* | (2006.01) |
| *A01N 25/30* | (2006.01) |

(52) U.S. Cl.
CPC ............. *A01N 53/00* (2013.01); *A01N 25/02* (2013.01); *A01N 25/30* (2013.01); *A01N 37/42* (2013.01)

(58) Field of Classification Search
CPC ........ A01N 53/00; A01N 25/02; A01N 25/30; A01N 37/42
See application file for complete search history.

(56) References Cited

U.S. PATENT DOCUMENTS

| | | | | |
|---|---|---|---|---|
| 4,367,344 A ‡ | 1/1983 | Gallenkamp | .......... | A01N 53/00 504/171 |
| 4,452,625 A ‡ | 6/1984 | Lurssen | ................ | A01N 53/00 504/13 |
| 6,361,783 B2 ‡ | 3/2002 | Moaddel | ................. | A61K 8/06 424/401 |
| 9,040,460 B2 ‡ | 5/2015 | Venburg | .................... | A23L 5/40 504/14 |
| 9,808,004 B2 ‡ | 11/2017 | Venburg | ................. | A01N 37/42 |
| 10,517,299 B2 * | 12/2019 | Sharma | ................. | A01N 25/22 |
| 2009/0011939 A1 ‡ | 1/2009 | Thrower | ................ | A01N 53/00 504/31 |
| 2010/0267557 A1 ‡ | 10/2010 | Silverman | .............. | A01N 37/30 504/11 |
| 2010/0317529 A1 ‡ | 12/2010 | Silverman | .............. | A01N 53/00 504/32 |
| 2015/0230463 A1 * | 8/2015 | Venburg | .................... | A23L 5/40 504/144 |
| 2015/0296776 A1 * | 10/2015 | Olds | ...................... | A01N 25/04 504/127 |
| 2016/0198714 A1 ‡ | 7/2016 | Stoller | ................... | A01N 25/02 504/136 |
| 2018/0279622 A1 ‡ | 10/2018 | Sharma | ................. | A01N 25/02 |

OTHER PUBLICATIONS

Colomera et al. 'Biotechnological washing of denim jeans', ScienceDirect Topics, 2015, pp. 1-2 (retrieved on May 30, 2018 from https://lwww.sciencedirect.com/topics/chemistry/ethoxylation); p. 1.‡

Apelbaum et al. 'Some Characteristics of the System Converting 1-Aminocyclopropane-1-carboxylic Acid to Ethylene', Plant Physiology, Jan. 1981, vol. 67, pp. 80-84; p. 82.‡

International Search Report and Written Opinion dated Aug. 8, 2018.‡

\* cited by examiner
‡ imported from a related application

*Primary Examiner* — Mina Haghighatian
(74) *Attorney, Agent, or Firm* — Wood, Phillips, Katz, Clark & Mortimer

(57) ABSTRACT

The present invention relates to 1-amino-1-cyclopropanecarboxylic acid hydrochloride salt formulations and methods of their use.

4 Claims, No Drawings

1-AMINO-1-CYCLOPROPANECARBOXYLIC ACID HYDROCHLORIDE FORMULATIONS

FIELD OF THE INVENTION

The present invention relates to 1-amino-1-cyclopropanecarboxylic acid hydrochloride salt formulations and methods of their use.

BACKGROUND OF THE INVENTION 1-amino-1-cyclopropanecarboxylic acid ("ACC") is a product of the enzyme ACC synthase and acts as a precursor for the biosynthesis of ethylene in plants. Ethylene has been shown to be involved in several plant responses including stress, fruit set, leaf abscission and anthesis. Because of its role as an ethylene precursor ACC has been used in agriculture to induce ethylene responsive events.

In the laboratory, ACC has been converted to several forms including ACC hydrochloride. However, ACC hydrochloride is not stable in solution at a pH from 2.7 to 8.5 and thus must be stored as a solid. For particular agricultural uses, solid ACC hydrochloride must be dissolved in a liquid carrier before application. This extra step can lead to increased cost to the end user due to the time needed to prepare the liquid compositions and errors made during preparation by the end user. Thus, there is a need in the art for a stable liquid ACC hydrochloride formulation.

SUMMARY OF THE INVENTION

The present invention is directed to liquid agricultural formulations comprising 1-amino-1-cyclopropanecarboxylic acid hydrochloride salt ("ACC HCl salt").

Formulations of the present invention may be aqueous or non-aqueous.

Formulations of the present invention may further comprise a surfactant.

DETAILED DESCRIPTION OF THE INVENTION

In one embodiment, the present invention is directed to a liquid agricultural formulation comprising ACC HCl salt and water, wherein the formulation has a pH from 2.75±0.3 to 8.5±0.3.

In another embodiment, the ACC HCl salt is at a concentration from about 1% to about 50% w/w, preferably from about 5% to about 25% w/w, even more preferably from about 14% to about 25% w/w. In another preferred embodiment, the ACC HCl salt is at a concentration from about 5% to about 20% w/w.

In another embodiment, aqueous formulations of the present invention further comprise a surfactant, preferably polyoxyethylene alkyl ether phosphate, more preferably polyoxyethylene alkyl ether phosphate with a degree of ethoxylation of 5 to 6 moles.

In another embodiment, aqueous formulations of the present invention further comprise ethylenediaminetetraacetic acid ("EDTA").

In another embodiment, the present invention is directed to a liquid agricultural formulation comprising ACC HCl salt and a non-aqueous solvent.

In another embodiment, the non-aqueous solvent is propylene glycol.

In another embodiment, non-aqueous formulations of the present invention further comprise a surfactant, preferably polysorbate 20.

In a preferred embodiment, the present invention is directed to aqueous agricultural formulation comprising:
  about 5% to about 25% w/w ACC HCl salt, preferably about 13.6% w/w;
  about 1% to about 5% w/w polyoxyethylene alkyl ether phosphate with a degree of ethoxylation of 5 to 6 moles, preferably about 2.5% w/w;
  about 0.1% to about 1.5% w/w EDTA, preferably about 0.5% w/w; and water,
wherein the formulation has a pH from 2.75±0.3 to 8.5±0.3, preferably from 4.0±0.3 to 8.0±0.3.

In a preferred embodiment, the present invention is directed to non-aqueous agricultural formulation comprising:
  about 5% to about 25% w/w ACC HCl salt, preferably about 13.6% w/w;
  about 60% to about 90% propylene glycol, preferably about 84% w/w; and
  about 1% to about 5% w/w polysorbate 20, preferably about 2.0% w/w In another embodiment, the present invention is directed to a method of reducing crop load comprising applying an effective amount of a formulation of the present invention to a tree fruit, preferably an apple tree or a stone fruit tree.

In another embodiment, the present invention is directed to a method of enhancing grape coloration comprising co-applying an effective amount of a formulation of the present invention and S-abscisic acid to a grape plant, preferably a seedless table grape variety.

Solvents suitable for use in the present invention include, but are not limited to, water, propylene glycol, dipropylene glycol, butyl glycol, ethylene glycol, diethylene glycol, triethylene glycol, tetraethylene glycol, an alcohol including a monohydric, dihydric or trihydric alcohol such as propanol, isopropanol, a 1:1 mixture of (cis, trans) 1,3-cyclohexanedimethanol and (cis, trans) 1,4-cyclohexanedimethanol (Unoxol® Diol; Unoxol is a registered trademark of and available from Union Carbide Chemicals & Plastics Technology Corporation), 1,3-propane diol, 1,3-butanediol, 1,4-butanediol, 1,5-pentanediol, 3-methyl-1,5-pentanediol, 2,4-diethyl-1,5-pentanediol, 2,4,4-trimethylhexane-1,6-diol, butenediol, butynediol, pentanediol, hexanediol, octanediol, neopentyl glycol, 2-methyl-1,3-propanediol, dibutylene glycol, butylene glycol, hexylene glycol, 1,4-cyclohexanedimethanol, 1,3-dihydroxy-2-methylpropane, butane-1,2,3-triol, butane-1,2,4-triol, hexane-1,2,6-triol and the like, a polyalkylene glycol such as polyethylene glycol, polypropylene glycol, polybutylene glycol, methoxy polyethylene glycol and the like, glycerol, polyglycerol, a glycol ether including a propylene or ethylene derivative of glycol ether such as propylene glycol methyl ether, dipropylene glycol methyl ether, tripropylene glycol methyl ether, propylene glycol n-propyl ether, ethylene glycol n-propyl ether, ethylene glycol n-butyl ether, diethylene glycol monomethyl ether, diethylene glycol ethyl ether, triethylene glycol methyl ether and the like, a sugar alcohol such as sorbitol and the like, a carbonate solvent such as ethylene carbonate, propylene carbonate, butylene carbonate and the like, dimethyl sulfoxide, an alkyl alkoxylate including fatty alcohol ethoxylate (Emulan™ TXI (Emulan is available from BASF), an alkyl EO/PO (ethylene oxide (EO), propylene oxide (PO)) and the like, an alkyl ester such as the ester of 2-ethyl hexanol and natural lactic acid (Agnique® AE 3-2EH; Agnique is a registered trademark of Cognis IP Management Gmbh Corporation), gamma-butyrolactone, ethyl lactate and the like, an acid such as propionic acid, a hydroxy acid such as lactic acid or glycolic acid and the like, a dimethyl amide solvent such as C8-C10 alkyl amide, dimethyl lactamide and the like, an esteramide such as N, N-dimethylcaprylamide, N, N-dimethyl 9-decenamide and the like, a pyrrolidone such as N-methyl-2-pyrrolidone, 2-pyrrolidone N-cyclohexyl-pyrrolidone and the like, triacetin, monoacetin, dimethylformamide, tetrahydrofuran, dimethylacetamide, N-formylmorpholine, diisopropyl amine and tetramethylurea Preferred solvents include water, ethylene glycol, diethylene glycol, 1,3-propane diol, polypropylene glycol, polyethylene glycol, glycerol, diethylene glycol monomethyl ether, sorbitol, propylene carbonate, fatty alcohol ethoxylate, the ester of 2-ethyl hexanol and natural lactic acid, ethyl lactate, dimethyl lactamide, N-methyl-2-pyrrolidione and monoacetin. The polyethylene glycol is, preferably, polyethylene glycol 200, 400 or 600. Solvents for use in the present invention may be present at a concentration from about 1% to about 99% w/w, preferably from about 50% to about 95% w/w and more preferably from about 70% to about 90% w/w. In a preferred embodiment, the solvent is water, more preferably at a concentration from about 70% to about 80% w/w. In another preferred embodiment, the solvent is propylene glycol, more preferably at a concentration from about 80% to about 90% w/w.

Surfactants suitable for use in aqueous formulations of the present invention include, but are not limited to, phosphate ester family surfactants, comprising mixtures of mono and di phosphate esters and having at least 5 degrees of ethoxylation including polyoxyethylene alkyl ether phosphate. Surfactants for use in aqueous formulations of the present invention may be present at a concentration from about 1% to about 10% w/w, preferably from about 1% to about 5% w/w. In a preferred embodiment, the aqueous formulation surfactant is polyoxyethylene alkyl ether phosphate, more preferably the polyoxyethylene alkyl ether has from 5 to 6 moles of ethoxylation. In another preferred embodiment, the polyoxyethylene alkyl ether phosphate is present at a concentration from about 1% to about 5% w/w, more preferably at about 2.5% w/w.

Surfactants suitable for use in non-aqueous but water miscible formulations of the present invention include, but are not limited to, nonionic surfactants including, but not limited to, an ethoxylated sorbitan ester such as polysorbate 20, 21, 23, 24 and the like, a sorbitan fatty acid ester such as sorbitan monolaurate, sorbitan monopalmitate, sorbitan monostearate, sorbitan monooleate and the like and Agnique® S-Maz® and T-Maz® (S-maz and T-maz are registered trademark of BASF CORPORATION) series and the like, an alkoxylated alkyl alcohol such as Tomadol® series of ethoxylated linear alcohols (Tomadol is a registered trademark of EVONIK Degussa GMBH), polyoxyethylene (20) oleyl ether, poly(ethylene glycol)-block-poly(propylene glycol)-block-poly(ethylene glycol), polyalkylene oxide block copolymer, ethoxylated fatty alcohol (CAS Registry No. 78330-21-9; Atlox® 4991, Atlox is a registered trademark of Croda Americas LLC), polyoxyethylene (8) monobranched alcohol, polyoxyethylene (2) C12-C15 alcohol (Cresmer A2), 2-ethyl hexanol EO-PO (Cas Registry No. 64366-70-7; Ecosurf™ EH-14), polyoxyethylene isodecyl ether, poly(ethylene glycol) (12) tridecyl ether and the like, a fatty alcohol alkoxylate or ethoxylate, such as Ecosurf™ LF-45), C12-14-secondary, ethoxylated alcohol, polyethylene glycol trimethylnonyl ether and the like, an ethoxylated alkylphenol such as octylphenol ethoxylates, Atlox® 775, alkylphenol ethoxylate, nonylphenol ethoxylate POE-14, poly(oxy-1,2-ethanediyl), alpha-(tris(1-phenylethyl)phenyl)-omega-hydroxy- and the like, a copolymer of ethylene oxide and propylene oxide such as Tergitol™ (Tergitol is available from Dow Chemicals) XJ, Tergitol™ L-64, Step-Flow® 26 (Step-Flow is a registered trademark of and available from Stepan Company Corporation), Toximul® 8323 (Toximul is a registered trademark of and available from Stepan Company Corporation), and the like, a block copolymer of ethylene oxide and propylene oxide such as polysorbates, Agnique® BP, Synperonic® PE/F series (Synperonic is a registered trademark of and available from Croda International PLC), Atlas G 5000 (CAS Registry No. 99821-01-9), a poloxamer, a propoxylated and, ¬ethoxylated fatty acid and the like, a polyoxyethylene ether such as polyoxyl 2 cetyl ether, polyoxyl 10 cetyl ether, polyoxyl 20 cetyl ether, polyoxyl 4 lauryl ether, polyoxyl 23 lauryl ether, polyoxyl 2 oleyl ether, polyoxyl 10 oleyl ether, polyoxyl 20 oleyl ether, polyoxyl 2 stearyl ether, polyoxyl 10 stearyl ether, polyoxyl 20 stearyl ether, polyoxyl 100 stearyl ether and the like, an ethoxylated fatty amine such as polyoxyethylene tallow alkylamine, cocoamine ethoxylate, tallowamine ethoxylate and the like, an ethoxylated fatty acid such as castor oil, ethoxylated, oleate, Cithrol® series including triglycerol diisostearate, PEG-20 glyceryl triisostearate and the like, Myrj® series of polyoxyethylene fatty acid esters (Myrj is a registered trademark of and available from Croda Americas LLC), fatty acid ethoxylate-POE-10, an ethoxylated fatty ester, an ethoxylated oil such as ethoxylated soybean oil, castor oil ethoxylate, polyoxyethylated castor oils and the like, a nonionic lignosulfonate such as Stepserse® DF-600 (Stepserse is a registered trademark of and available from Stepan Company) and the like, an alkylpolysaccharide such as C8-C10 alkylpolysaccharide, alkylpolyglucosides, D-glucopyranose, oligomeric, C9-11-alkyl glycoside and the like, a polymeric surfactant such as a nonionic block copolymer, phosphate ester surfactants and the like and silicone based surfactants such as polyalkyleneoxide modified heptamethyltrisiloxane, silicone emulsion, polyether trisiloxane and the like and anionic surfactants, including but not limited to, a phosphate ester such as oleth-3 phosphate, polyoxyethylene alkyl ether phosphate, potassium cetyl phosphate and the like, an alkyldiphenyloxide disulfonate salt such as alkyldiphenyloxide disulfonate, an alkyl sulfate such as sodium lauryl sulfate and the like, an alkyl benzene sulfonate such as calcium 4-dodecan-3-ylbenzenesulfonate, calcium salt of alkyl(C10-16)benzenesulfonic acid, sodium C14-16 olefin sulfonate and the like, a sulfate or sulfonates of an ethoxylated alkylphenol such as sodium nonylphenol ethoxylate sulfate, POE-4, ammonium salt of ethoxylated polyarylphenol sulfate and the like, a sulfonate of condensed naphthalene, a sulfonate of naphthalene and alkyl naphtha, a sulfuosuccinate and derivatives thereof such as bis(2-ethylhexyl) sulfosuccinate sodium salt, sodium dioctyl sulfosuccinate and the like, an ether sulfate, such as sodium laureth sulfates and the like, a polymeric surfactant such as modified styrene acrylic polymer, nonionic block copolymer, polyoxyethylene polyaryl phenol (Cresplus DP available from Croda Americas LLC) and the like and mixtures thereof and amphoteric surfactants, including but not limited to sodium alkyliminodipropionate, lecithin and lecithin derivatives and the like and mixtures of thereof and mixtures of nonionic surfactants, anionic surfactants and amphoteric surfactants.

Surfactants suitable for use in the present invention include, but are not limited to, surfactants sold under the trade names Tween® including 20-24 and the like (Tween is a registered trademark of and available from Uniqema), Span™ including 20-80 (Span is available from Croda Americas LLC), Agnique®, Tomadol®, Brij® including 020, C10, C2, C20, L4, L23 and 520, (Brij is a registered trademark of Croda Americas LLC), Synperonic® including PE/F series, Atlox® including 4991, MBA 11/8, 775, 3484, 4912, Metasperse, 4913, 671, 793, 3467, AL-3273 and 3416, Cresmer™ including A2 (Cresmer is available from Croda Americas LLC), Ecosurf™ including EH-14, SA-15 and LF45 (Ecosurf is available from Dow Inc.), Toximul® including 8315, 8320, 8323, 8325, 8304, CA 7.5, TA-15, 8240 and DM-83, Makon® including 14, TD and TSP-25 (Makon is a registered trademark of and available from Stepan Company Corporation), Lutensol® (Lutensol is a registered trademark of and available from BASF Aktiengesellschaft Corporation), Tergitol™ including XJ, XH, 15 s-9, 15 s20, TMN-10 and L-64, Triton including X-100, X114, CG-50, H-55 and GR-5M (Triton is available from Dow Inc.), Lissapol including PA (Lissapol is available from Croda Americas LLC, Step-Flow® including 26, Pluronic® (Pluronic is a registered trademark of and available from BASF Corporation), Ultraric® including PE (Ultraric is a registered trademark of and available from OXITENO S.A.), Alkest® including E 100 (Alkest is a registered trademark of and available from OXITENO S.A.), Alkamul® (Alkamul is a registered trademark of and available from Rhodia Operations Corporation), Cithrol (available from Croda Americas LLC), Myrj® (Myrj is a registered trademark of and available from Croda Americas LLC), Ninex® including MT (Ninex is a registered trademark of and available from Stepan Company Corporation), Cirrasol® including G-1282 (Cirrasol is a registered trademark of and available from Croda International PLC), Etocas including 32 (Etocas is available from Croda Americas LLC), Stepsperse® including DF-200 and DF-600 (Stepserse is a registered trademark of and available from Stepan Company Corporation), Multitrope including 1214 and 1620 (Multitrope is available from Croda Americas LLC), Cresplus including DP and 1209 (Cresplus is available from Croda Americas LLC), Silwet® (Silwet is a registered trademark of and available from Momentive Performance Materials Inc.), Break-Thru® (Break-thru is a registered trademark of and available from Evonik Degussa GMBH), Xiameter® including OFX-5211 (Xiameter is a registered trademark of and available from Dow Inc.), Crodafos (Crodafos is available from Croda Americas LLC), Stepfac™ including 8715 (Stepfac is available from Stepan Company Corporation), Agrilan® including 1028 (Agrilan is a registered trademark of and available from Akzo Nobel Chemicals International), Dowfax™ including 3B2 (Dowfax is available from Dow, Inc.), Stepwet® including DF-95 (Stepwet is a registered trademark of and available from Stepan Company Corporation), Ninate® including 60E (Ninate is a registered trademark of and available from Stepan Company Corporation), Bio-Terge® including AS-40 (Bio-terge is a registered trademark of and available from Stepan Company Corporation), Polystep® including B-27 (Polystep is a registered trademark of and available from Stepan Company Corporation), Steol® including TSP-16N and CS-370 (Steol is a registered trademark of and available from Stepan Company Corporation), Morwet® (Morwet is a registered trademark of and available from Akzo Nobel Chemicals International), Powerblox™ including SN (Powerblox is available from Dow, Inc.), Dispersol including F CONC and SC 873 (Dispersol is available from Croda Americas LLC), Aerosol® including OT-B (Aerosol is a registered trademark of Cytec Technology Corp and available from Solvay), Multiwet (Multiwet is available from Croda Americas LLC), Zephrym® including PD3315 (Zephrym is a registered trademark of and available from Uniqema Americas LLC), Sil-MES® including 100 (Sil-MES is a registered trademark of and available from Drexel Chemical Company), Atplus® including 309F (Atplus is a registered trademark of and available from Croda Americas LLC), Micro-step including H-303 (Micro-step is available from Stepan Company Corporation) and Crodateric including TO (Crodateric is available from Croda Americas LLC) and Alcolec® (Alcolec is a registered trademark of and available from American Lecithin Company).

Surfactants for use in non-aqueous formulations of the present invention may be present at a concentration from about 1% to about 10% w/w, preferably from about 1% to about 5% w/w. In a preferred embodiment of an aqueous formulation, the surfactant is polysorbate 20, more preferably present at a concentration from about 1% to about 5% w/w, even more preferably at about 2.0% w/w.

Preservatives suitable for use in formulations of the present invention include, but are not limited to, benzisothiazolinone, methylchloroisothiazolinone, methylisothiazolinone, citric acid, Myacide® series of preservatives including 2-bromo-2-nitropropane-1,3-diol, pentane-1,5-dial glutaric dialdehyde solution, 2,4-dichlorobenzyl alcohol, bronopol, 2,4-dichlorobenzenemethanol-d2 and the like (Myacide is a registered trademark of and available from BASF Aktiengesellschaft Corporation), Protectol® series of preservatives including 1,5-pentanedial, 2-phenoxyethanol, and formic acid (Protectol is a registered trademark of and available from BASF Aktiengesellschaft Corporation), Kathon® CG/ICP (5-chloro-2-methyl-1,2-isothiazol-3-one/2-methyl-2H-isothiazol-3-one; Kathon is a registered trademark of Rohm and Haas Comp any and Kathon CG/ICP is available from Dow Chemicals), benzoates, potassium sorbate and combinations thereof.

Chelating agents suitable for use in formulations of the present invention include, but are not limited to, EDTA, EDTA salts, citrates, gluconates and combinations thereof.

In some embodiments, the compositions may include additional surfactants, crystal growth inhibitors, stickers, spreaders, leaf penetrants, dispersants, a systemic acquired resistance inducer, anti-foaming agents, preservatives, pH regulators, solubilization agents, a humectant, a dye, U.V. (ultra-violet) protectants, a vehicle or other components which facilitate production, storage stability, product handling application and biological efficacy.

The present invention provides very stable aqueous and non-aqueous formulations for foliar spray, drench, in-furrow and seed treatment applications.

Throughout the application, the singular forms "a," "an," and "the" include plural reference unless the context clearly dictates otherwise.

The term "effective amount" denotes an amount that is sufficient to provide the sought-after result.

As used herein, all numerical values relating to amounts, weight percentages and the like that are defined as "about" or "approximately" each particular value denotes the value plus or minus 10%. For example, the phrase "about 10% w/w" is to be understood as encompassing values from 9% to 11% w/w. Therefore, amounts within 10% of the claimed values are encompassed by the scope of the invention.

As used herein, the term "co-applying" refers to applying the formulation of the present invention and S-abscisic acid as a pre-mix, simultaneously applying each or sequentially applying each. Preferably sequential application of the formulation of the present invention and S-abscisic acid occurs within 24 hours.

As used herein, the terms "with from 5 to 6 moles of ethoxylation" and "has from 5 to 6 moles of ethoxylation" each refer to a polyoxyethylene alkyl ether phosphate with a degree of ethoxylation of this exact range and not a polyoxyethylene alkyl ether phosphate with an overlapping range (i.e. polyoxyethylene alkyl ether phosphate with from 4 to 5 moles of ethoxylation).

These representative embodiments are in no way limiting and are described solely to illustrate some aspects of the invention.

The invention is demonstrated by following representative examples. The following examples are offered by way of illustration only and not by way of limitation.

EXAMPLES

Example 1. Titration of ACC HCl Salt Solutions

Method

When ACC HCl salt was added to water to a concentration of 10% w/w ACC the pH was determined to be 1.0±0.3. The solution was then titrated with each of sodium hydroxide, N,N dimethyl ethanolamine, triethanolamine, choline hydroxide, ammonium hydroxide dimethyl amine, and tri-ethyl tetramine to achieve more basic solutions.

Results

Upon titration to achieve a more basic solution precipitates formed at a pH range of 2.75±0.3 to 8.5±0.3 for each of the bases. Further titration to a pH above 9.0 resulted in all precipitates dissolving into solution. Thus, ACC HCl salt solutions are inherently unstable at a pH range of 2.75 to 8.5.

Example 2. Screening of Non-Aqueous Solvents to Prepare Stable ACC HCl Salt Solutions Method ACC HCl salt was added at 1-gram increments to 1 liter of each of the solvents in Table 1 at about 21° C. while stirring until the salt would no longer solubilize. The last measured solubility is listed in Table 1, below.

TABLE 1

Non-aqueous Solvent Screening

| Solvent | Measured Solubility of ACC HCl (% w/w) |
|---|---|
| Propylene glycol | 27 |
| Dipropylene glycol | 8 |
| Propylene carbonate | <2 |
| Ethylene glycol | 34 |
| 1,3-propane diol | 25 |
| Diethylene glycol | 25 |
| Glycerin | 14 |
| Polyethylene glycol 200 | 21 |
| Polyethylene glycol 400 | 14 |
| Polyethylene glycol 600 | 14 |
| Polypropylene glycol | 14 |
| N-methyl-2-pyrrolidinone | 20 |
| Ethyl lactate | 14 |
| Diethylene glycol monomethyl ether | 14 |
| Fatty alcohol ethoxylate | 14 |
| The ester of 2-ethyl hexanol and natural lactic acid | 14 |
| Monoacetin | 14 |
| Dimethyl lactamide | 20 |

As seen in Table 1, above, a variety of non-aqueous solvents were capable of solubilizing at least 14% ACC HCl salt, which corresponds to at least 10% ACC. Propylene carbonate was not capable of solubilizing 2% ACC HCl salt alone.

Example 3. Chemical Stability of ACC HCl Salt in Select Non-Aqueous Solvents

Method

Formulations were prepared with 14% w/w initial concentration of ACC HCl and 2.500 w/w Tween® 20 in each of the following solvents: 1,3 propanediol; ethylene glycol; diethylene glycol; dimethyl lactamide; and N-methyl pyrrolidone. Each formulation was then stored at 54 C for 3 weeks, which is the equivalent of storage for 3 years at room temperature. ACC HCl salt concentration was measured at time 0 and at 3 weeks. Results of this stability test are shown in Table 2, below.

TABLE 2

Chemical Stability of ACC HCl in Select Solvents

| | ACC HCl (% w/w) | | |
|---|---|---|---|
| Solvent | Initial | 3 weeks | (% loss) |
| Diethylene glycol | ~14% | 13.8 | 1.4 |
| Dimethyl lactamide | 13.9 | 13.5 | 2.9 |
| N-methyl pyrrolidone | 14.0 | 13.9 | 0.7 |
| 1,3 propanediol | 14.14 | 13.9 | 1.7 |
| Ethylene glycol | 14.0 | 13.6 | 2.9 |

As seen in Table 2, above, storage of ACC HCl in each of the selected solvents at accelerated storage conditions resulted in only nominal changes in ACC HCl concentration indicating good long-term storage stability.

Example 4. Chemical Stability of ACC HCl Salt in Select Non-Aqueous Solvents

Method

Formulations were prepared with 14% w/w initial concentration of ACC HCl and 2.5% w/w Tween® 20 in each of the following solvents: polyethylene glycol and propylene glycol. Each formulation was then stored at 5 or 54 C for 2 weeks, which is the equivalent of storage for 2 years at room temperature. ACC HCl salt concentration was measured at time 0 and at 2 weeks. Results of this stability test are shown in Table 3, below.

TABLE 3

Chemical Stability of ACC HCl in Select Solvents

| | ACC HCl (% w/w) | | | | |
|---|---|---|---|---|---|
| Solvent | Initial | 5 C., 2 weeks | % loss | 54 C., 2 weeks | % loss |
| Polyethylene glycol | 14.16 | 14.20 | −0.3% | 13.81 | 2.5% |
| Propylene glycol | 14.10 | 14.10 | 0% | 13.15 | 6.7% |

As seen in Table 3, above, storage of ACC HCl in each of the selected solvents at accelerated storage conditions resulted in only nominal changes in ACC HCl concentration indicating good long-term storage stability.

Example 5. Screening of Surfactants to Prepare Stable ACC HCl Salt Solutions Method Surfactants were added to the ACC HCl salt solution of Example 1 at concentrations as shown in Table 4, below. The solution was then titrated with potassium hydroxide to achieve a more basic solution. Due to the exothermic nature of the titration process, titration occurred in a water bath maintained at a temperature of 20° C.±5° C.

TABLE 4

Surfactant Screening

| Surfactant | Conc. (w/w) | Precipitates Formed |
|---|---|---|
| Atlox ® 4913 (nonionic block copolymer) [Croda Inc.] | 1 to 2.5% | YES |
| Brij ® O20 (polyoxyethylene vegetable-based fatty ether derived from cetyl alcohol) [Croda Inc.] | 2.5% | YES |
| Crodateric ™ LIDP-LQ (sodium alkyliminodipropionate) [Croda Inc.] | 2.5% | YES |
| Multitrope ™ 1214 (polyoxyethylene alkyl ether phosphate with a degree of ethoxylation of 4 to 5 moles) [Croda Inc.] | 2.9% | YES |
| Tween ® 20 (polysorbate 20) | 2.5% | YES |
| Brij ® O20 + Atlox ® 4913 | 2.5% 1 to 2.5% | YES |
| Crodafos ™ D4A (polyoxyethylene alkyl ether phosphate with a degree of ethoxylation of 5 to 6 moles) [Croda Inc.] | 1.0% | YES |
| Crodafos ™ D4A (polyoxyethylene alkyl ether phosphate with a degree of ethoxylation of 5 to 6 moles) | 2.5% | NO |
| Crodafos ™ D4A (polyoxyethylene alkyl ether phosphate with a degree of ethoxylation of 5 to 6 moles) | 5.0% | YES |

Result

Upon titration to achieve a more basic solution, precipitates formed at a pH range of 2.75±0.3 to 8.5±±0.3 for each of the surfactants except, surprisingly, Crodafos™ D4A at 2.5% w/w. Further titration to a pH above 9.0 resulted in all precipitates dissolving into solution for each of the formulations. Thus, specific surfactants at specific concentrations can stabilize ACC HCl salt solutions. Further, it was determined that addition of ethylenediaminetetraacetic acid ("EDTA"), specifically EDTA tetrasodium salt dihydrate having CAS number 10378-23-1, at a concentration of about 0.5% w/w surprisingly further enhanced solution stability.

Example 6. Preparing Stable Non-Aqueous ACC HCl Salt Formulations

Method

A formulation was prepared containing 13.6% ACC HCl salt, 84.4% propylene glycol and 2% Tween® 20.

Result

Surprisingly, the high concentration of ACC HCl salt was soluble in these non-aqueous solvents. Further, non-aqueous formulations of the present invention remained stable when placed at 5° C. Thus, specific non-aqueous formulations can stabilize ACC HCl salt.

The following ACC HCl salt formulations of the present invention were subjected to bioefficacy studies:

Formula #1 (Formulation 1)

| | |
|---|---|
| 13.6% w/w | ACC HCl salt |
| 2.5% w/w | Crodafos ™ D4A |
| 4.95% w/w | Potassium hydroxide (45% w/w) |
| 0.1% w/w | Kathon ® CG/ICP |
| 0.5% w/w | EDTA |
| 78.35% w/w | water |
| 4.0 | pH |

Formula #2 (Formulation 2)

| | |
|---|---|
| 13.6% w/w | ACC HCl salt |
| 2.5% w/w | Crodafos ™ D4A |
| 6.26% w/w | Potassium hydroxide (45% w/w) |
| 0.1% w/w | Kathon ® CG/ICP |
| 0.5% w/w | EDTA |
| 77.04% w/w | water |
| 8.2 | pH |

Formula #3 (Formulation 3)

| | |
|---|---|
| 13.6% w/w | ACC HCl salt |
| 2.0% w/w | Tween ® 20 |
| 84.4% w/w | Propylene Glycol |

Example 7. Cotton Cotyledon Bioefficacy Assay

Method

As a part of the titration studies of ACC HCl salt (see Example 1, above), the effect of pH on ACC was determined. This was accomplished with solutions of either ACC HCl or ACC free acid titrated to appropriate pH's. Once prepared, solutions were amended with 0.05% (v/v) of a non-ionic surfactant and spray applied to the adaxial surface of 10-day old cotton cotyledons using a track sprayer. In addition to ACC-containing solutions, appropriate controls were tested. Two days (48 hours) after spray application, the cotyledons from each plant were removed, weighed and incubated in sealed glass vials for 4 to 7 hours. Headspace ethylene evolution by the cotyledons was measured by gas chromatography using standard methods.

TABLE 5

Effect of Solution pH and ACC form on Ethylene Production (nL/g FW/hr) by Cotton Cotyledons

| | Ethylene Production (nL/g FW*/hr) | |
|---|---|---|
| Treatment | pH 2.5 | pH 5.0 |
| Control | 0.7 | 0.7 |
| 250 ppm ACC HCl | 26.9 | 16.5 |
| 250 ppm ACC free acid | 31.1 | 13.4 |

*FW: Fresh weight

Results

In Table 5, above, we show that pH has a significant effect on the ethylene-generating ability of ACC solutions and that this effect is independent of ACC form. An ACC HCl solution at pH 2.5 generated 65% more ethylene than the same solution at pH 5.0. This ethylene generating activity by pH was seen regardless of whether the ACC was the free acid or the HCl salt form.

Example 8. Cotton Cotyledon Bioefficacy Assay

Method

Formulations 1 and 2 (Example 3, above) were diluted with water to 500 ppm of ACC and were assayed as is shown in Example 4. The controls contained all excipients of the formulations and had a pH of 7.5. In contrast, the spray solutions of the formulations 1 and 2 were at pH 4.4 and 7.6, respectively. Forty-eight (48) hours after application, the cotyledons were removed and incubated in sealed vials for 4 to 7 hours. Following incubation, the cotyledons were measured for ethylene gas production by gas chromatography.

TABLE 6

Effect of ACC formulation application on ethylene production by cotton

| Treatment | Ethylene (nL C2H4/g FW/hr) |
| --- | --- |
| Control | 1.3 |
| Formulation 1, 500 ppm ACC | 70.3 |
| Formulation 2, 500 ppm ACC | 37.1 |

Results

As seen in Table 6, above, spray applications of either formulation significantly increased ethylene production from cotton cotyledons. In this study the effect of solution pH is also dramatic: spray solution of formulation 1, with a pH of 4.4 produced nearly twice as much ethylene as the spray solution of formulation 2 (pH 7.6). This result confirms the role of solution pH as an important property in the bioefficacy of ACC generally and in particular the ACC HCl salt formulations as shown.

Example 9. Phytotoxicity Assay

Method

Formulations 1, 2 and 3 were diluted with water to 1000 ppm of ACC and a tank-mix non-ionic surfactant was added to an effective concentration of 0.5% (v/v). Dilution of the formulations in deionized water resulted in a slight decrease in pH. Spray solutions were applied to 12-day old cowpea plants at a spray rate to ensure complete coverage.

Results

No Phytotoxicity was observed as a result of any spray treatment. However, the spray treatments could eventually lead to either leaf yellowing (cowpea) or leaf abscission (peach tree shoots). However, leaf yellowing or abscission are known consequences of ethylene production and are not due to phytotoxicity of the formulations of the present invention. No Phytotoxicity was observed on cowpea. Thus, ACC HCl salt formulations of the present invention are proved to be safe on plants.

Example 10. Apple Fruitlet Thinning Assay

Method

Formulations 1-3 were diluted with water to 408 ppm ACC HCl salt (i.e. molar equivalent to 300 ppm ACC free acid) and applied to Gala apple fruit when mean fruit diameter was 20 mm along with ACC free acid at 300 ppm. The apple plants were allowed to reach fruit set and set fruits were counted and compared to an untreated control. Fruit set was calculated as the number of fruits which set on a sample of 100 flower clusters.

TABLE 7

Effect of ACC formulation activity on apple thinning activity as measured by the number of fruit which set per 100 flower clusters.

| ACC formulation | Fruit set (fruit/100 flower clusters) |
| --- | --- |
| Control | 87 |
| ACC Free acid | 70 |
| Formulation 1 | 64 |
| Formulation 2 | 63 |
| Formulation 3 | 48 |

Result

As seen in Table 7, above, fruit set is reduced by about 30-45% formulations of the present invention, compared to a reduction of only 20% with the molar equivalent of the free acid form. Thinning after application by formulations 1-3 is better than thinning resulting from application of the aqueous solution of ACC free acid at the same molar concentration. Thus, ACC HCl salt formulations of the present invention are an improvement for achieving fruit thinning from the aqueous solution of ACC free acid.

Example 11. Red Grape Coloration Assay

Method

Formulations 1-3 and an aqueous solution of ACC free were each combined separately with ProTone® (20% S-abscisic acid, potassium salt) at a concentration of 200 ppm S-abscisic acid. An aqueous solution of ACC free acid was combined at a concentration of 200 ppm whereas Formulations 1-3 were combined at a concentration of 272 ppm, which is equivalent to 200 ppm free acid ACC on a molar basis. To each spray solution, a non-ionic spray adjuvant was added (Latron B-1956) at a final concentration of 0.05% (v/v). These formulations were then applied to vines of Flame Seedless variety red grapes at three different locations in California. The effect of Formulations on grape coloration is reported at the number of grape bunches on each vine that reached a commercially acceptable level of red color, expressed as a percent of the total number of bunches on each vine.

TABLE 8

Effect of ACC formulation activity on coloration of Flame Seedless table grapes. Data are expressed as the percent of marketable bunches meeting commercially acceptable color grade standards at the end of the season.

| | Percent Marketable Bunches | | |
| --- | --- | --- | --- |
| ACC Formulation | Location 1 | Location 2 | Location 3 |
| UTC | 39 | 20 | 42 |
| ProTone ® | 60 | 59 | 58 |
| ProTone ® + ACC Free acid | 78 | 52 | 75 |
| ProTone ® + Formulation 1 | 91 | 66 | 79 |
| ProTone ® + Formulation 2 | 83 | 65 | 75 |
| ProTone ® + Formulation 3 | 92 | 71 | 94 |

Result

As seen in Table 8, above, in combination with ProTone®, Formulas 1-3 resulted in increased coloration of marketable grape clusters (bunches) compared to untreated vines and compared to vines treated with ProTone® only. Those vines treated with Formulations 1-3 were numerically equivalent or superior to vines treated with the aqueous solution of ACC free acid. Thus, the experimental ACC HCl salt formulations of the present invention were at least equivalent and often superior to the aqueous solution of ACC free acid. Formulation 3 was superior to the aqueous solution of ACC free acid and to Formulation 1 and Formulation 2 in all cases.

What is claimed is:

1. A liquid agricultural formulation comprising 1-amino-1-cyclopropanecarboxylic acid hydrochloride salt (ACC HCl salt), 2.5% w/w of a polyoxyethylene alkyl ether phosphate having a degree of ethoxylation of 5 to 6 moles and water, wherein the formulation has a pH from 2.75±0.3 to 8.5±0.3 and wherein w/w denotes weight by total weight of the formulation.

2. The formulation of claim 1, wherein the ACC HCl salt is present at a concentration of about 1% to about 50% weight by weight of the formulation.

3. The formulation of claim 1, wherein the ACC HCl salt is present at a concentration of about 5% to about 25% weight by weight of the formulation.

4. The formulation of claim 1, further comprising ethylenediaminetetraacetic acid.

* * * * *